(12) United States Patent
Fujii

(10) Patent No.: US 6,223,024 B1
(45) Date of Patent: Apr. 24, 2001

(54) INTERMITTENT CONTROL RECEPTION CIRCUIT FOR LOW CONSUMPTIVE CURRENT SAKE

(75) Inventor: Tomohiro Fujii, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/157,568

(22) Filed: Sep. 21, 1998

(30) Foreign Application Priority Data

Sep. 19, 1997 (JP) .................................................. 9-254969

(51) Int. Cl.[7] .................................................. H04B 1/16
(52) U.S. Cl. .................................................. 455/343
(58) Field of Search .................................. 455/343, 341, 455/337, 308

(56) References Cited

U.S. PATENT DOCUMENTS

| | | | |
|---|---|---|---|
| 5,156,046 | * 10/1992 | Tanimoto et al. | 73/204.18 |
| 5,396,521 | * 3/1995 | Minami | 375/344 |
| 5,475,877 | * 12/1995 | Adachi | 455/343 |
| 5,477,194 | * 12/1995 | Nagakura | 331/10 |

FOREIGN PATENT DOCUMENTS 59-149436    8/1984   (JP) .

\* cited by examiner

Primary Examiner—Daniel Hunter
Assistant Examiner—Thuan T. Nguyen
(74) Attorney, Agent, or Firm—Sughrue, Mion, Zinn, Macpeak & Seas, PLLC

(57) ABSTRACT

An intermittent control reception circuit enables materialization of low consumptive current of a reception circuit to be performed while executing intermittent control operation of a data output circuit and a low voltage detector respectively with the exception of increasing outer terminal. The reception circuit causes the data output circuit and the low voltage detector to be operated selectively in compliance with logic level of a signal inputted to the control terminal provided for the control switching circuit. Further, the control circuit to which output of the data output circuit and output of the low voltage detector are inputted, has the ability to recognize which output is inputted by the control switching circuit. Also in cases where materialization of LSI of the reception circuit is performed, it enables intermittent operation of the data output circuit and the low voltage detector to be implemented to materialize low consumptive current with the exception of increasing outer output terminal.

6 Claims, 11 Drawing Sheets

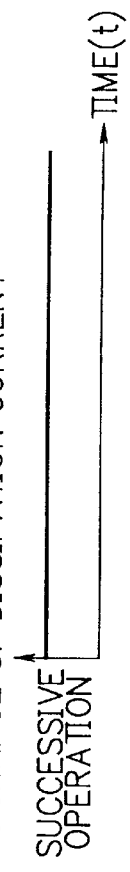
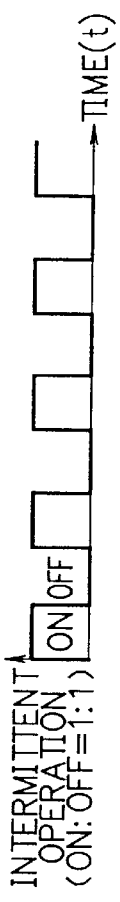
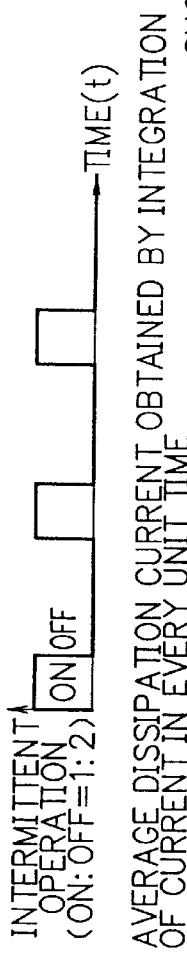
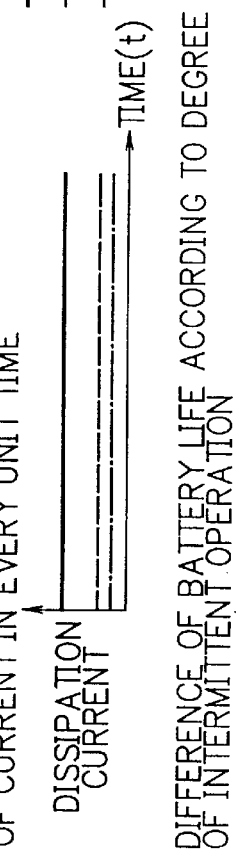
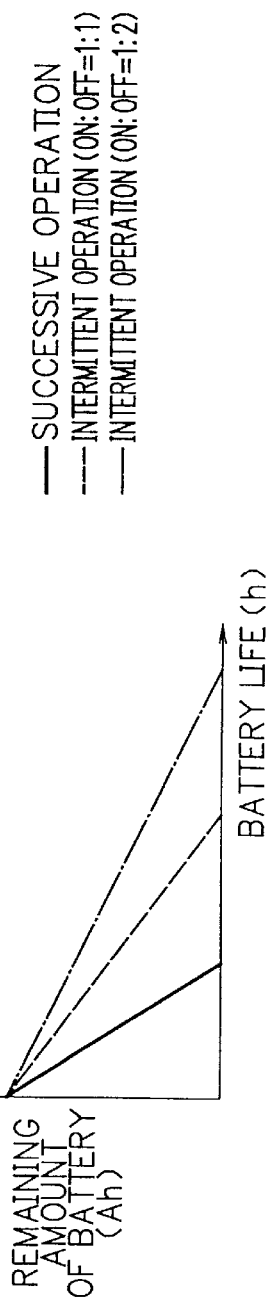
FIG. 1A PRIOR ART — TIME CHANGE OF DISSIPATION CURRENT
FIG. 1B PRIOR ART — AVERAGE DISSIPATION CURRENT OBTAINED BY INTEGRATION OF CURRENT IN EVERY UNIT TIME
FIG. 1C PRIOR ART — DIFFERENCE OF BATTERY LIFE ACCORDING TO DEGREE OF INTERMITTENT OPERATION

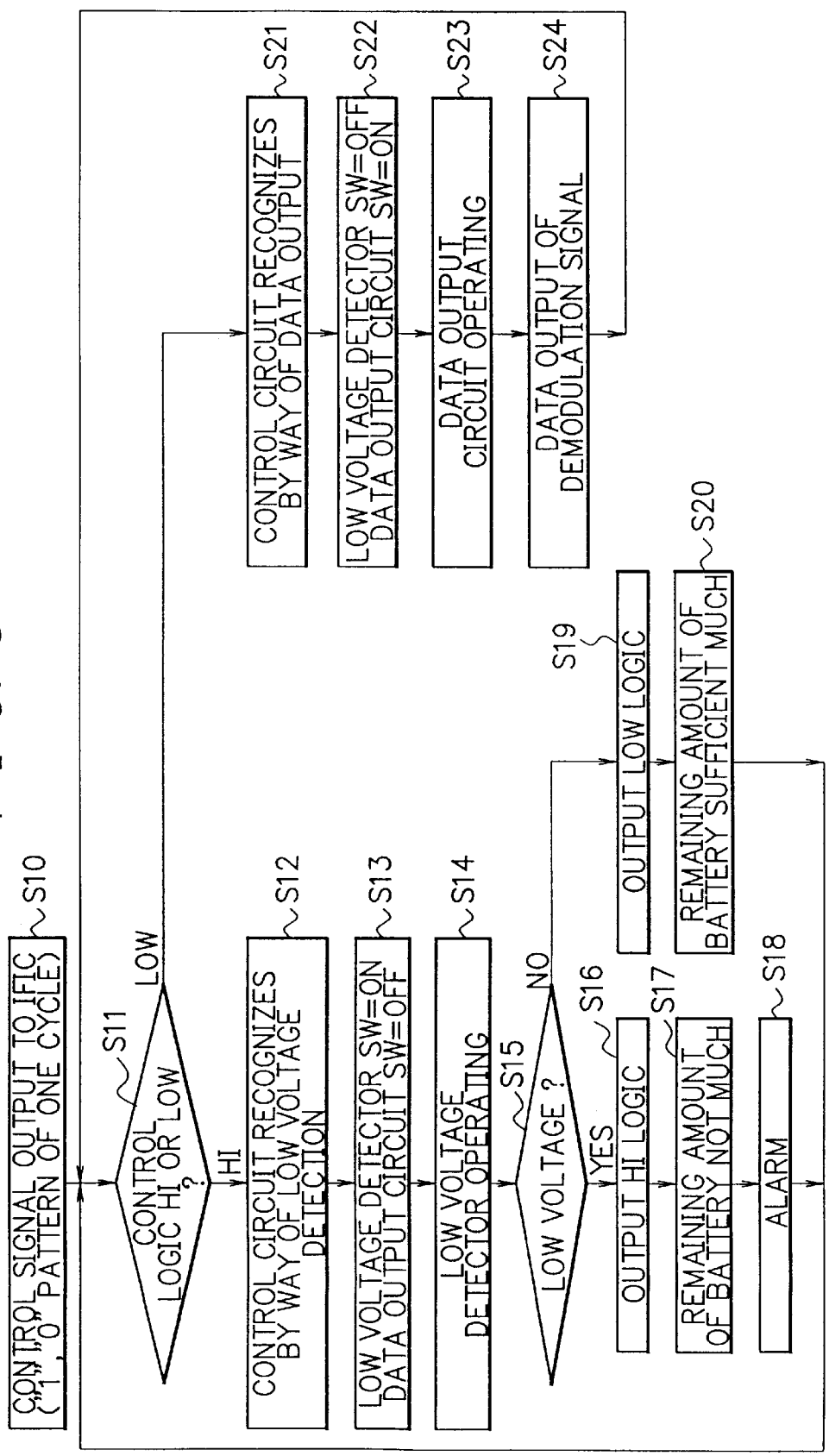

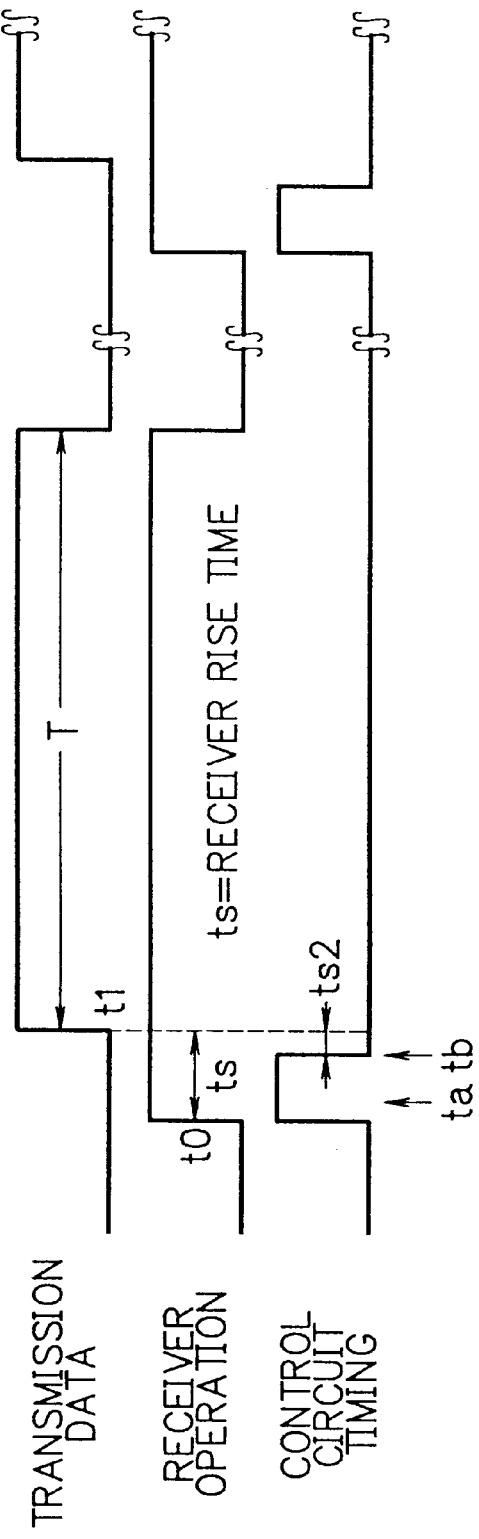
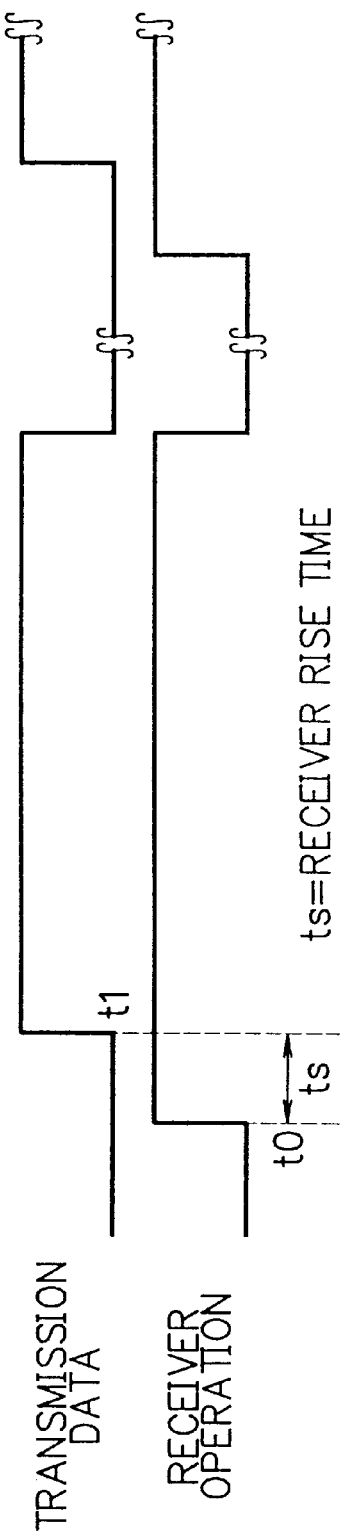

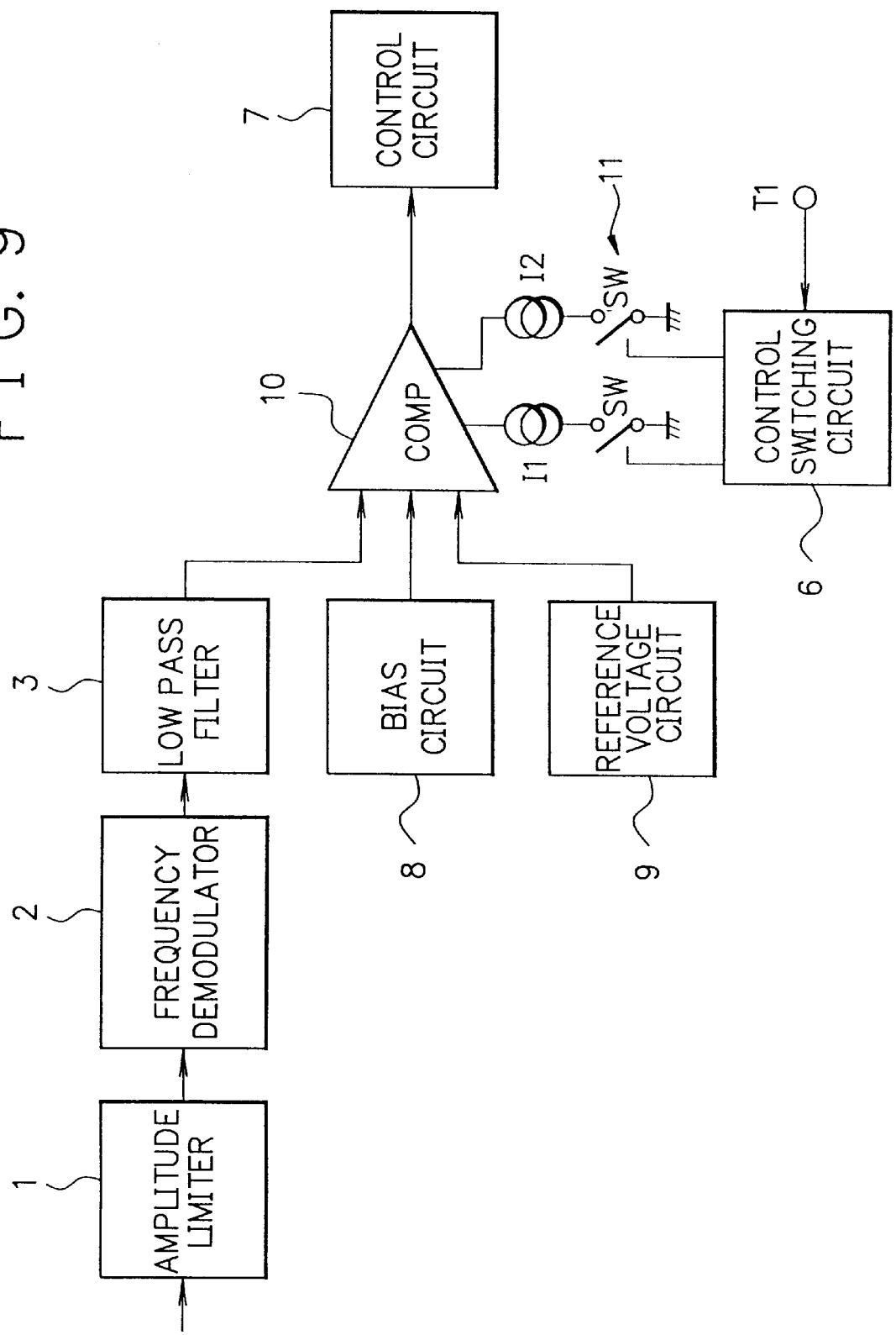

INTERMITTENT CONTROL RECEPTION CIRCUIT FOR LOW CONSUMPTIVE CURRENT SAKE

BACKGROUND OF THE INVENTION

The present invention relates to a reception circuit. More particularly, this invention relates to an intermittent control reception circuit such as a frequency demodulator in which an intermittent control operation is performed for the sake of low consumptive current as objective.

DESCRIPTION OF THE RELATED ART

In recent years, portable terminal equipments such as a portable telephone, a radio selective-calling receiver and so forth whose technology progresses to the direction that it causes the terminal equipment to be miniaturized, and to be lightened in terms of its body, and also causes the terminal equipment to be lessened in terms of its dissipation current. Among them, with respect to miniaturization and lightening thereof, one method is that power-supply battery is miniaturized, while, with respect to decreasing of dissipation current, it becomes general that the intermittent control operation in which it causes receiver-operation to be performed ON/OFF in constant cycle is executed. The intermittent control operation enables shortening of life time accompanied with miniaturization of the power-supply battery to be improved. The remaining amount of the battery is represented by the unit of Ah (Ampere-hour), thus battery life is capable of being calculated by dissipation current in every unit time. Namely, when it causes the receiver to be implemented intermittent control by the time-timing as shown in FIG. 1A, average dissipation current which is obtained in such a way that current in every unit time is integrated, is shown as FIG. 1B, with the result that when it causes the receiver to be operated at all times regardless of intermittent control, dissipation current increases in quantity exceedingly. Consequently, the battery life is shown in FIG. 1C, since the dissipation current in every unit time increases in quantity exceedingly, when there is no intermittent control, the battery life comes to be short. While, dissipation current in every unit time comes to be approximately ½ (inclination being ½) in comparison with no intermittent control, when it causes timing ON/OFF of the receiver to be implemented by intermittent control of 1:1 thereby, the battery life comes to be approximately two times. Thus, the higher the ratio of the intermittent control operation, namely the longer the total time of OFF-state, the more the battery life is lengthened. Further, the case where the intermittent control operation is possible is confined to the case where necessary data is not transmitted at the state of OFF of the receiver. Namely, the transmission data is separated into several groups, and communication system is confined to the case where it is appropriate that it causes data within certain group of the above several groups to be received.

On the other hand, in this kind of portable equipment, the lower the remaining amount of the battery reduction, the less the normal operation as the equipment is performed, therefore, it is necessary to notify degree of consumption of the battery in order to maintain normal operation thereof, thus there is provided configuration notifying lowering of the amount of the battery by alarm or display indication. For instance, in the radio selective-calling receiver, which notifies the timing of battery change by the alarm or the display indication. A low voltage detector is in use for the circuit notifying battery change, in this kind of radio selective-calling receiver, it is called an intermediate frequency amplifier or simply demodulation circuit, being applied to the circuit so called IFIC (Intermediate Frequency Integrated Circuit, or Demodulation Integrated Circuit).

FIG. 2 is a circuit diagram showing a conventional block circuit of IFIC. The IFIC is provided with an amplitude limiter 101 for limiting amplitude level of input signal being subjected to frequency demodulation to prescribed level, a frequency demodulator 102 for demodulating output signals of the amplitude limiter 101, a low pass filter 103 for filtering low frequency signals from demodulated signals, a switching circuit 106 for switching cut-off frequency of the low pass filter 103, a data output circuit 104 for performing digital output of the demodulated signal, and a low voltage detector 105 for notifying it when the power source voltage deteriorates. The respective outputs of the low voltage detector 105 and the data output circuit 104 are inputted to the control circuit 107 individually. The control circuit 107 controls an operation which executes signal output and notifying of deterioration of the remaining amount of the battery based on these data output and output of low voltage detection.

Further, for instance, as shown in FIG. 3A, the low voltage detector 105 comprises a bias circuit 111 which is followed by voltage of internal battery 110, a reference voltage circuit 112 maintained to fixed voltage, and a comparator 113 for comparing voltage of the bias circuit 111 and the reference voltage of reference voltage circuit 112. In this low voltage detector, as shown in FIG. 3B, the voltage value of the reference voltage circuit 112 is taken to be V1, the remaining amount of the battery deteriorates, thus resulting in lowering of voltage of the bias circuit 111, when voltage of the bias circuit 111 deteriorates to V1, this agrees with threshold value of the comparator 113 so that output of the comparator 113 is inverted. The inversion signal is inputted to the control circuit 107 from the low voltage detector 105, so that the control circuit 107 generates alarm.

Now, in the IFIC, the operation is implemented in the timing shown in FIG. 6B at the data output circuit 104 and the low voltage detector 105. In the data output circuit 104, which receives transmission data to output data, supposing necessary transmission data is transmitted at the time t1, efficiency is the best, if the timing of ON of the receiver operation is t1. However, some prescribed time period is required for operating normally in terms of the receiver, when the receiver changes from OFF to ON. This time period is so called as rise time for the receiver, and also so called as rise time of local oscillator of the receiver. For this reason, it is necessary to turn the receiver ON-state at the time t0 before the time t1 corresponding to rise time ts of the local oscillator, in accordance with this operation, the data output circuit 104 starts the operation from the time t0. However, the data output circuit 104 is enough to be started in the timing of the time t1, even though it causes the data output circuit 104 to be operated at the time of t0, the data during ts is unnecessary data, thus unnecessary current is consumed. Consequently, it is desirable that it causes the intermittent control operation in which operation of the data output circuit is stopped to be implemented at least this period. This matter is also applied to the low voltage detector 105, in the conventional method, the operation of the low voltage detection is always implemented within the operating time of the receiver, however, it is enough that the low voltage detector 105 implements detecting operation of the low voltage at the certain timing of operation time period of the receiver. It is capable of being implemented the intermittent control operation by the low voltage detector 105 similar to the data output circuit 104.

Thus, it is desirable to implement intermittent control operation of the data output circuit and the low voltage detector. However, it is necessary to provide exclusive terminal for implementing intermittent control operation on the respective circuits, in order to implement intermittent control operation in terms of the circuits practically. However, in LSI which constitutes these circuits size of the package and the number of the terminals are specified, these are incapable of being established voluntarily, therefore it is difficult to materialize increasing of only one terminal easily. Supposing it causes required package to be formed in accordance with the requirement, it is necessary to retry circuit design, and package design wholly from the beginning, thus it takes development time, and development cost. Consequently, the conventional manner is that the intermittent control operation is materialized only the case where the new receiver is designed and manufactured. There occurs the problems that it is nearly impossible to materialize low consumptive current while materializing the intermittent control operation in the IFIC using LSI which previously exists.

SUMMARY OF THE INVENTION

In view of the foregoing, it is an object of the present invention to provide an intermittent control reception circuit which enables intermittent control operation both of low voltage detector and data output circuit to be implemented to materialize low consumptive current with the exception of increasing new outer terminal.

In one arrangement to be described below by way of example in illustration of the invention, an intermittent control reception circuit includes a data output circuit for outputting signal with received and demodulated signal as digital signal, a low voltage detector for detecting drop of power source voltage, a control switching circuit having control terminal to which timing signal is inputted, and a control circuit to which both of output signal of the data output circuit and output signal of the low voltage detector, wherein the control switching circuit causes the data output circuit and the low voltage detector to be operated selectively in compliance with logical state of timing signal inputted to the control terminal, and the control circuit recognizes both of output of the data output circuit and output of the low voltage detector in compliance with logical state of the timing signal.

In another arrangement to be described below by way of example in illustration of the invention, an intermittent control reception circuit includes a data output circuit for outputting signal with received and demodulated signal as digital signal, a low voltage detector for detecting drop of power source voltage, a control switching circuit having control terminal to which timing signal is inputted, and a control circuit to which both of output signal of the data output circuit and output signal of the low voltage detector, wherein the low voltage detector and the data output circuit are constituted by a comparator which is operated by at least three input terminals and at least two load current sources, and the control switching circuit causes the data output circuit and the low voltage detector to be operated selectively while controlling the comparator, and the control circuit recognizes both of output of the data output circuit and output of the low voltage detector in compliance with state of the comparator.

In one particular arrangement to be described below in illustration of the present invention by way of example, input-output ends of the data output circuit and the low voltage detector of the intermittent control reception circuit are connected to the control switching circuit and the control circuit respectively by way of internal circuit of semiconductor integrated circuit device, and control terminal of the control switching circuit is constituted by way of outer terminal of the semiconductor integrated circuit device.

In yet particular arrangement to be described below in illustration of the present invention by way of example, the intermittent control reception circuit outputs timing signal whose Hi-level and Low-level are controlled alternately in prescribed cycle is inputted to the control terminal.

In yet particular arrangement to be described below in illustration of the present invention by way of example, the intermittent control reception circuit is subjected to timing control in such a way that the low voltage detector starts ON-operation before prescribed time from time point when receiver operation is turned ON, while the data output circuit starts ON-operation after elapsing the prescribed time from time point when receiver operation is turned ON.

In yet particular arrangement to be described below in illustration of the present invention by way of example, the intermittent control reception circuit further includes, at least, an amplitude limiter for limiting amplitude level of input signal being subjected to frequency demodulation to prescribed level, a frequency demodulator for demodulating output signal of said amplitude limiter, and a low pass filter having at least one cut-off frequency, all of which are connected to said data output circuit, thus outputting said demodulated signal by way of digital signal.

The above and further objects and novel features of the invention will be more fully understood from the following detailed description when the same is read in connection with the accompanying drawings. It should be expressly understood, however, that the drawings are for purpose of illustration only and are not intended as a definition of the limits of the invention.

BRIEF DESCRIPTION OF THE DRAWINGS

FIGS. 1A, 1B, and 1C are views explaining low consumptive current in the intermittent control operation;

FIG. 5 is a flow chart explaining operation of the first embodiment;

FIGS. 6A, and 6B are timing chart showing timing of receiver operation both of conventional one and the present invention;

FIG. 9 is a block circuit view showing a second embodiment of the present invention;

DETAILED DESCRIPTION OF THE PREFERRED EMBODIMENTS

Figure 2:
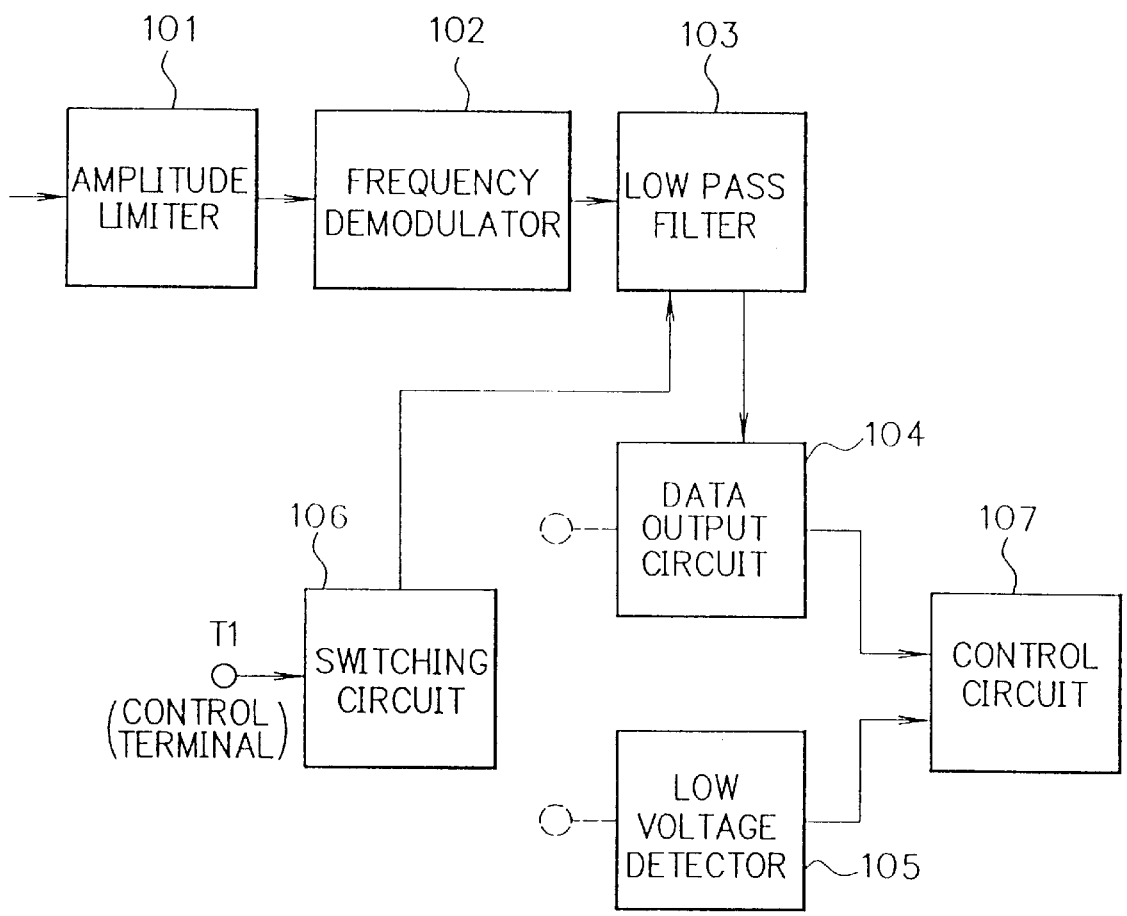
FIG. 2 is a block circuit view showing a conventional one example of the reception circuit.
Figure 3A:
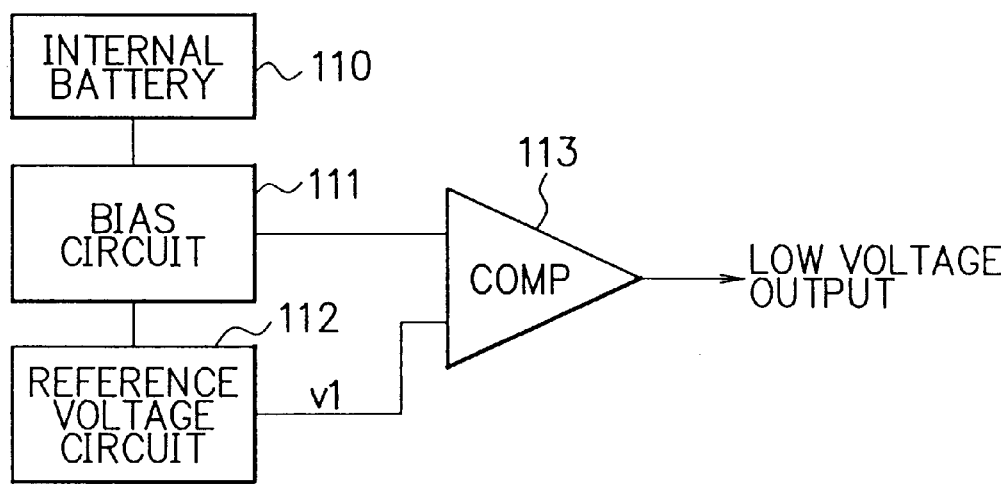
FIG. 3A is a circuit view showing a general low voltage detector.
Figure 3B:
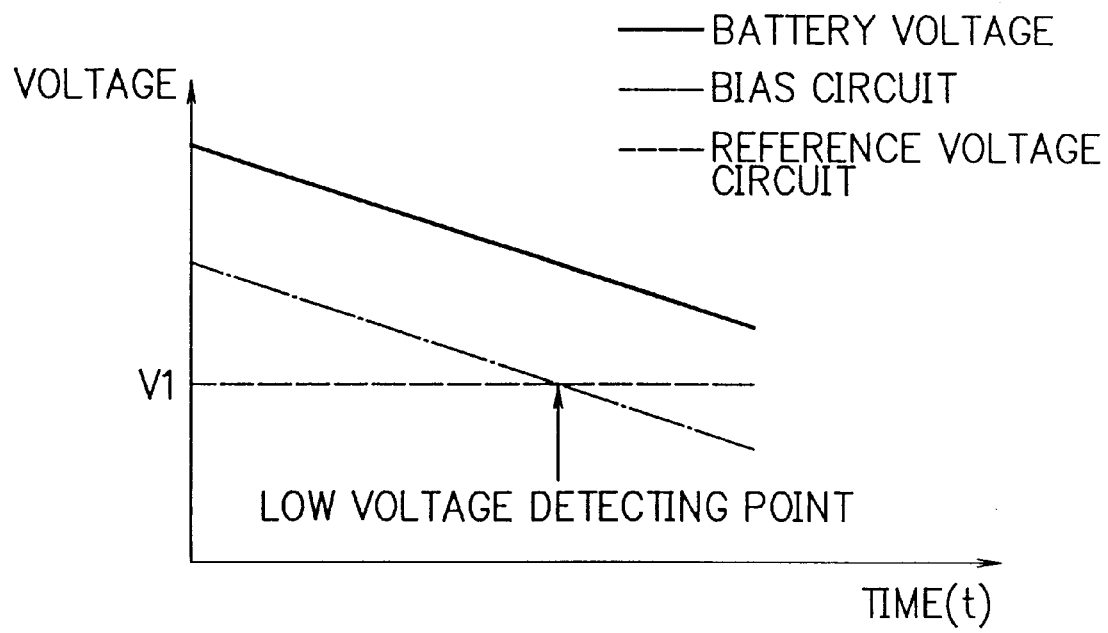
FIG. 3B is an operation explaining view explaining operation of the low voltage detector of FIG. 3A.
Figure 4:
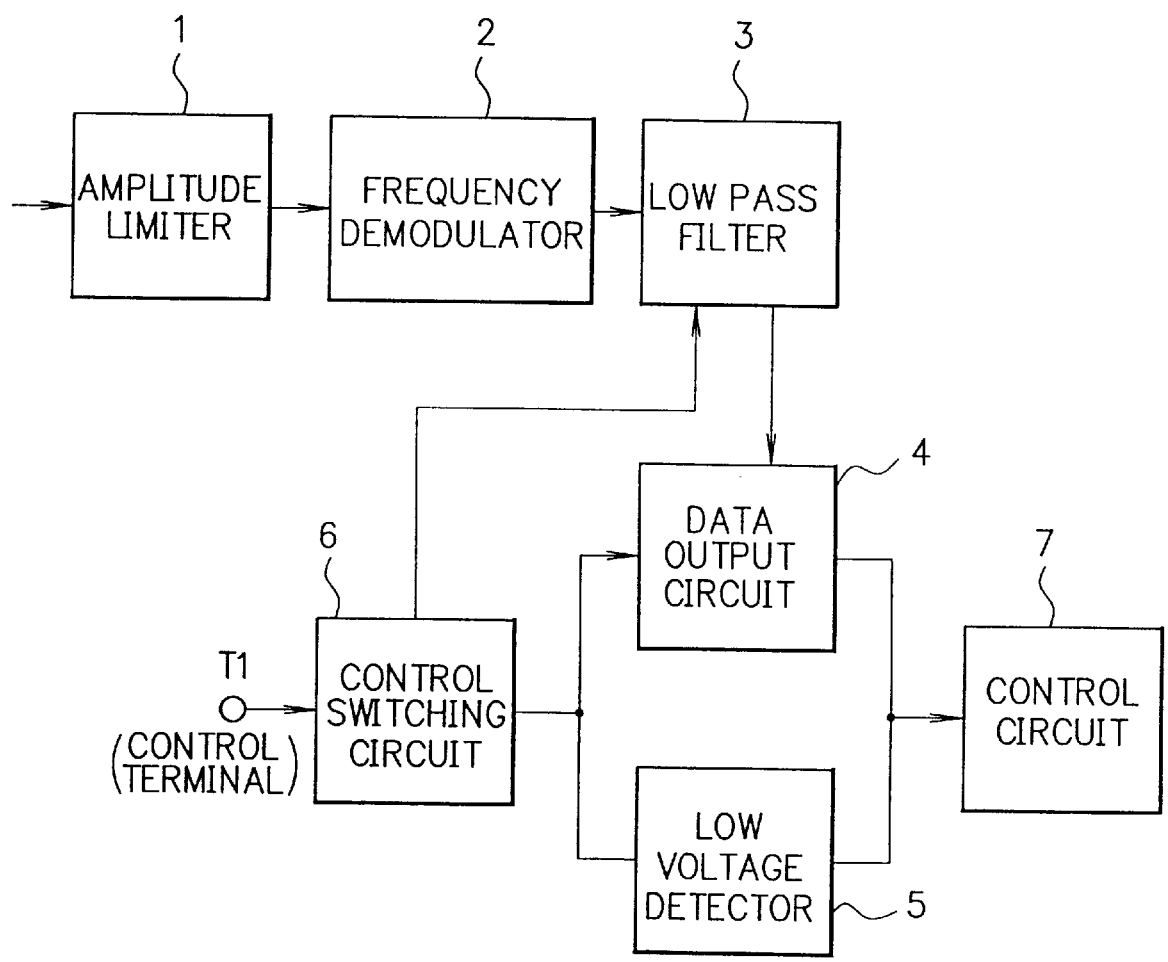
FIG. 4 is a block circuit view showing a first embodiment of the present invention.

A preferred embodiment of the invention will be described in detail referring to the accompanying drawings. FIG. 4 is a block circuit view showing a first embodiment in which the present invention is applied to IFIC of a receiver. The IFIC comprises an amplitude limiter 1 for limiting amplitude level of input signal subjected to frequency modulation to required level, a frequency demodulator 2 for demodulating output signal of the amplitude limiter 1, a low pass filter 3 for filtering low frequency signal of demodulated signal, a data output circuit 4 for digital-outputting demodulated signal, a low voltage detector 5 for detecting the state where battery voltage lowers from the reference voltage, a control switching circuit 6 for causing the data output circuit 4 and the low voltage detector 5 to execute the intermittent control operation based on the control signal inputted to a control terminal T1 and for selecting output of respective circuits, and a control circuit 7 whose input terminal is connected to output terminal of respective circuits to enable the output of the low voltage detector 5 and the data output circuit 4 to input respectively. Namely, the control circuit 7 recognizes the output signal from the data output circuit 4 and detected signal from the low voltage detecting circuit 5 individually due to operation of the control switching circuit 6, in addition thereto, the control circuit 7 is constituted so as to execute control of data output and control of low voltage information based on these recognized signals. Further, with regard to the operation from the amplitude limiter 1 to the low pass filter 3, the description is omitted because the operation thereof is the same as that of the FM demodulation circuit which is provided formerly.

FIG. 5 is a flow chart for explaining an intermittent control operation in the IFIC. The timing control circuit (not illustrated) inputs timing signal of Hi: "1" or Low: "0" to control terminal T1 of the control switching circuit 6 (S10). Subsequently, in the control circuit 7, by way of the signal to be inputted, when the timing signal is "1", the low voltage detector 5 comes to be ON state, and the data output circuit 4 comes to be OFF state. For this state, a low voltage detecting signal from the low voltage detector 5 is outputted, simultaneously, the control circuit 7 recognizes that the inputted signal is an output from the low voltage detector 5. Further, it causes lowering of battery capacity to be informed by display indication or alarm when the battery capacity lowers from the prescribed capacity based on the low voltage detecting signal (S11 to S20). Furthermore, since the operation of the low voltage detector 5 is the same as that of the conventional one shown in FIGS. 1A, 1B, and 1C, the explanation thereof is omitted. On the other hand, when the timing signal is "0", the low voltage detector 5 comes to be OFF state, and the data output circuit 4 comes to be ON state. Under the circumstances, the data signal which is received and is demodulated is outputted from the data output circuit 4, thus the control circuit 7 recognizes that the inputted signal is the output of the data output circuit. Subsequently, the output data is outputted to the circuit (not illustrated), thus executing the required data processing (S21 to S24).

FIG. 6A shows control timing of the low voltage detector 5 and the data output circuit 4. In FIG. 6A, with respect to the timing of the transmission data and the operation of the receiver, the timing thereof is the same as that of the conventional one, thus being omitted. Further, the control timing denotes the timing of low voltage detector 5 and the data output circuit 4. At the time of t1, control logic of control circuit timing comes to be Hi at the timing which is the same timing as that of ON of operation of the receiver. In answer to the Hi of the control logic, the low voltage detector 5 comes to be ON state, thus the low voltage detector 5 is operated. Further, in these time periods, the data output circuit 4 is of the OFF state. Subsequently, the control circuit 7 recognizes the result of low voltage detection with the timing of time ta, thus regarding the battery capacity as not enough if the output of low voltage detection is Hi, before notifying this state by alarm and so forth. The operation of the low voltage detector is performed during short cycle of ts–ts2, and other time period T+ts is of the OFF state, with the result that low consumptive current is materialized corresponding to the time period of T+ts time, thus the battery life is lengthened. Further, the control logic changes into Low from Hi by the timing of the time tb. In answer to Low of the control logic, the data output circuit 4 comes to be ON state, thus the data output circuit 4 is operated. Further, in terms of the time ts2, t1≠tb is set while considering rise time of the data output circuit 4. The receiver rises at t0, a local oscillator which requires the rise time extremely comes into possible to implement data output while demodulating transmitted data, because the local oscillator is capable of being operated at the time t1. Within a section ts–ts2, the data output circuit does not operate with the result that materialization of low consumptive current corresponding to the section is possible.

Figure 7:
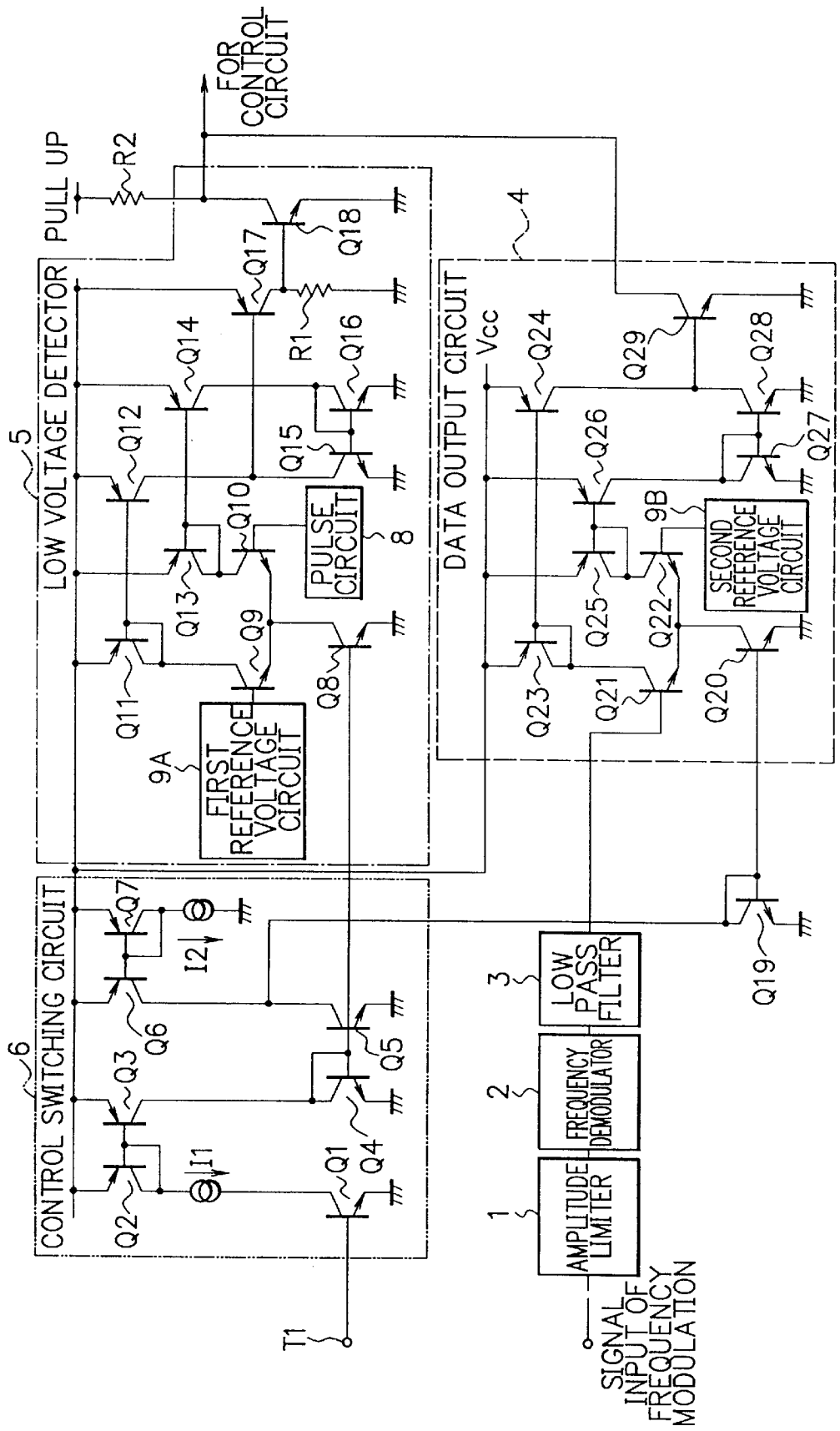
FIG. 7 is a circuit view showing a concrete example of the first embodiment of the present invention.

FIG. 7 is a circuit view showing a concrete example of IFIC of the first embodiment of the present invention. In FIG. 7, the data output circuit 4 is within dotted line, the low voltage detector 5 is within chain line, and the control switching circuit 6 is within two-dot chain line. In the circuit, Q1 to Q29 denote MOS transistors, R1, and R2 denote resistor, and I1, and I2 denote load current source. Further, there is provided the first reference voltage circuit 9A and the bias circuit 8 within the low voltage detector 5, and there is provided the second reference voltage circuit 9B within the data output circuit 4. Furthermore, in the present circuit, I1, and I2 are set to be I1>I2.

In the circuit, first, when the timing signal of "1" is inputted to the control terminal T1 of the control switching circuit 6, namely, base input of Q1 comes into Hi-state, Q1 comes into ON-state, thus current equivalent to the current of the load current source I1 flows into collector of current mirror circuit of Q2, and Q3, and into collector of current mirror circuit of Q4, Q5 and Q8. Here, hfe of respective transistors are set to hfe=100, thus base current is disregarded. Here, Q8 is a load current source transistor of the low voltage detector 5 consequently, when the collector current of Q8 flows, the low voltage detector 5 is operated. Furthermore, the current flows in Q8 caused by the fact that the current mirror circuit receives the load current source I2, however, no current flows into Q19, since whole collector current of Q8 is retracted into Q5 because of I1>I2. Since no current flows into Q19, also no current flows into Q20 which is constituted by the current mirror circuit of Q19. Here, Q20 is the load current source transistor of the data output circuit 4 thereby, the data output circuit 4 does not operate, because no current flows into Q20. Since the data output circuit 4 does not operate, no current flows into Q29, thus output impedance becomes high so that logic of output part depends on only state of the low voltage detector 5.

Now, when the remaining amount of the battery is of sufficient much, namely, when power supply voltage is high, voltage of the reference voltage circuit is constant without reference to the battery voltage, relationship in between these voltages comes into a bias circuit voltage>a reference voltage. In this case, it is capable of being regarded as Q9 being OFF, and Q10 being ON. The current flows into Q13, Q14, Q16, and Q15 on account thereof the current flows into Q17, and Q18, and no current flows into Q11, and Q12. Consequently, output thereof becomes Low. Furthermore, when the remaining amount of the battery is insufficient, namely, when power supply voltage is low, relationship in between these voltages comes into the bias circuit voltages<the reference voltage. In this case, it is capable of being regarded as Q9 being ON, and Q10 being OFF. No current flows into Q13, Q14, Q16, and Q15 on account thereof no current flows into Q17, and Q18. Consequently, output thereof becomes Hi.

Next, when the timing signal of "0" is inputted to the control terminal T1 of the control switching circuit 6, namely, base input of Q1 comes into Low-state, Q1 comes into OFF-state, thus no current of the load current source I1 flows into current mirror circuit of Q2, and Q3, and into current mirror circuit of Q4, Q5 and Q8. Here, Q8 is a load current source transistor of the low voltage detector 5 consequently, when no current of Q8 flows, the low voltage detector 5 does not operate. Since the low voltage detector 5 does not operate, also no current flows into Q18, thus output impedance thereof becomes high, so that logic of output part depends on only the state of the data output circuit 4. The current flows into Q6 while receiving the current of the load current source I2 by the current mirror circuit Q19, and Q20 which receives the current flowing into Q6. Here, Q20 is the load current source transistor of the data output circuit 4, thereby the data output circuit operates because the current flows into Q20. Furthermore, the data output circuit 4 of the present invention has inversion output characteristic.

Figure 8A:
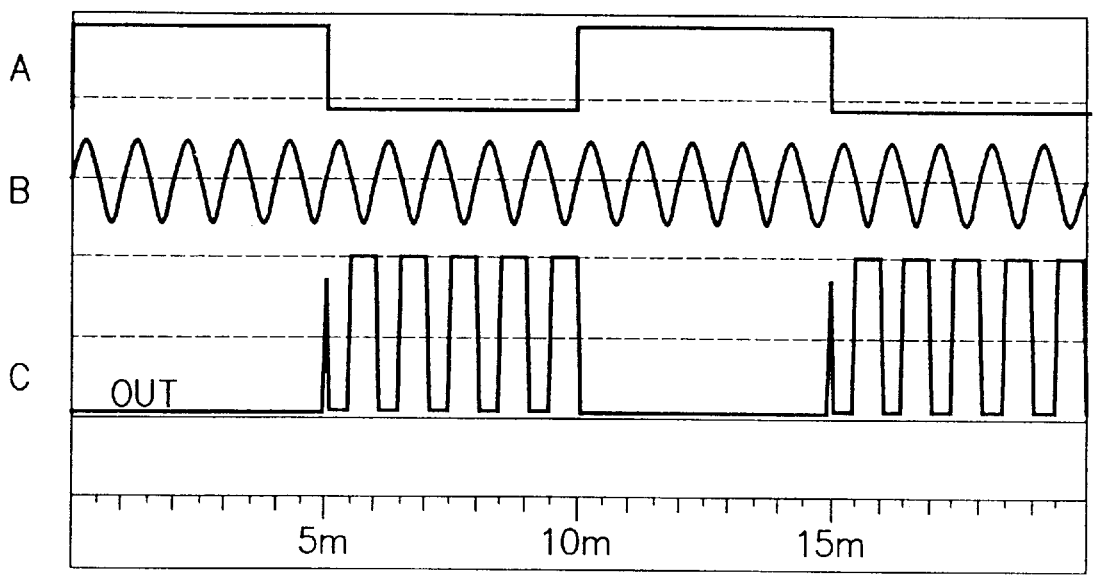
FIG. 8A is a simulation view showing a state that battery capacity is sufficient.
Figure 8B:
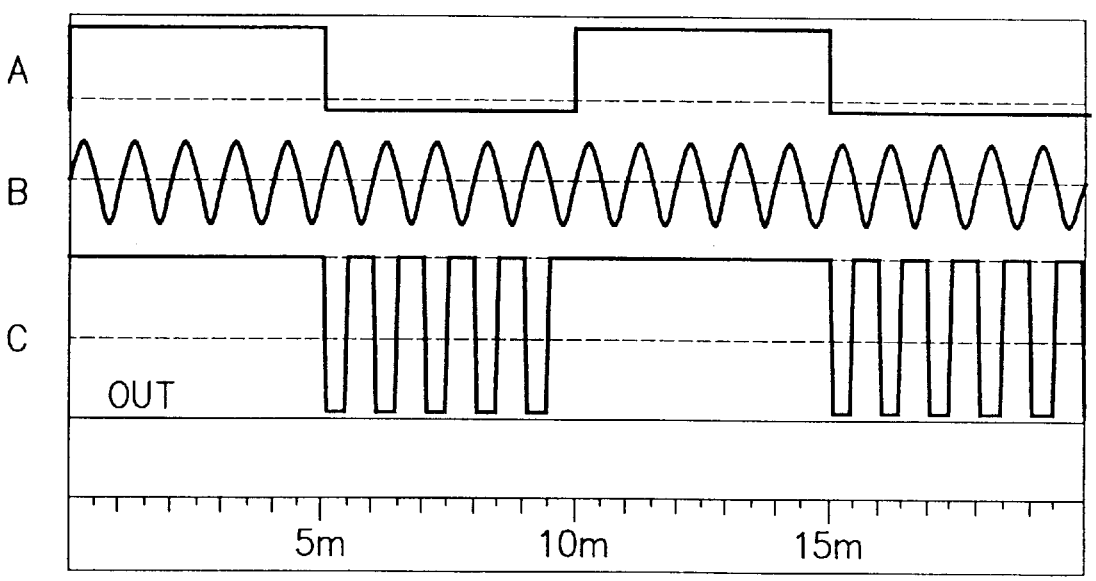
FIG. 8B is a simulation view showing a state that battery capacity is insufficient.

FIGS. 8A, and 8B show result of simulation in terms of above described circuit operation, executed by circuit simulator such as Spice and so forth. FIG. 8A shows that the remaining amount of the battery is of sufficient much, and FIG. 8B shows the state that the battery diminishes in remaining amount. Waveform A is control logic of the timing signal inputted to Q1 of the control switching circuit, as stated above, the low voltage detector 5 operates under Hi-state, and the data output circuit 4 operates under Low-state. Waveform B is the waveform of data output passed through the low pass filter after frequency demodulation, in the present simulation f is set to f=1 KHz. Waveform C designates output of the low voltage detector 5 and the data output circuit 4, when the waveform A is Hi-logic, the control circuit 7 recognizes as output of the low voltage detector, while when the waveform A is of Low logic, the control circuit recognizes as data output. As understood from these matters, when the waveform A is of the Hi-logic, FIG. 8A denotes that the remaining amount of the battery is of sufficient much because of the Low-logic, on the other hand, FIG. 8B denotes that since the battery diminishes in remaining amount, and the battery is to be changed because of the Hi-logic. Subsequently, when the waveform A is of the Hi-logic, the data output circuit 4 does not operate, while when the waveform A is of the Low-logic, the low voltage detector 5 does not operate, therefore, it is capable of materializing low consumptive power.

As described above, in the circuit of the embodiment, the circuit enables these data output circuit 4 and the low voltage detector 5 to operate alternate intermittent control operation respectively with the exception that the terminal is provided to control with the data output circuit 4 and the low voltage detector 5 respectively by virtue of controlling of the timing signal inputted to the control terminal T1 of the control switching circuit 6. On account of this matter, the circuit of the embodiment enables low consumptive current of the whole reception circuit to be materialized while eliminating unnecessary operation in the data output circuit 4 and the low voltage detector 5 with the exception of increasing terminal newly in the IFIC, and it is unnecessary to implement design changes of LSI. Further, the control switching circuit is capable of utilizing the control terminal as it is, which is provided for the conventional switching circuit.

Next, there will be explained a second embodiment of the present invention. FIG. 9 is a block diagram showing the second embodiment. A circuit of the second embodiment comprises an amplitude limiter 1 for limiting an amplitude level of an input signal being subjected to frequency demodulation to prescribed level, a frequency demodulator 2 for demodulating the output signal of the amplitude limiter 1, a low pass filter 3, a bias circuit 8 depending on battery voltage regulation, a reference voltage circuit 9 independent from the battery voltage regulation, a 3-input comparator 10, a load current source 11, a control switching circuit 6 for controlling the load current source, and a control circuit 7. The 3-input comparator 10 operates by way of the low voltage detector or the data output circuit based on the logic variation of the control switching circuit 6.

Figure 10:
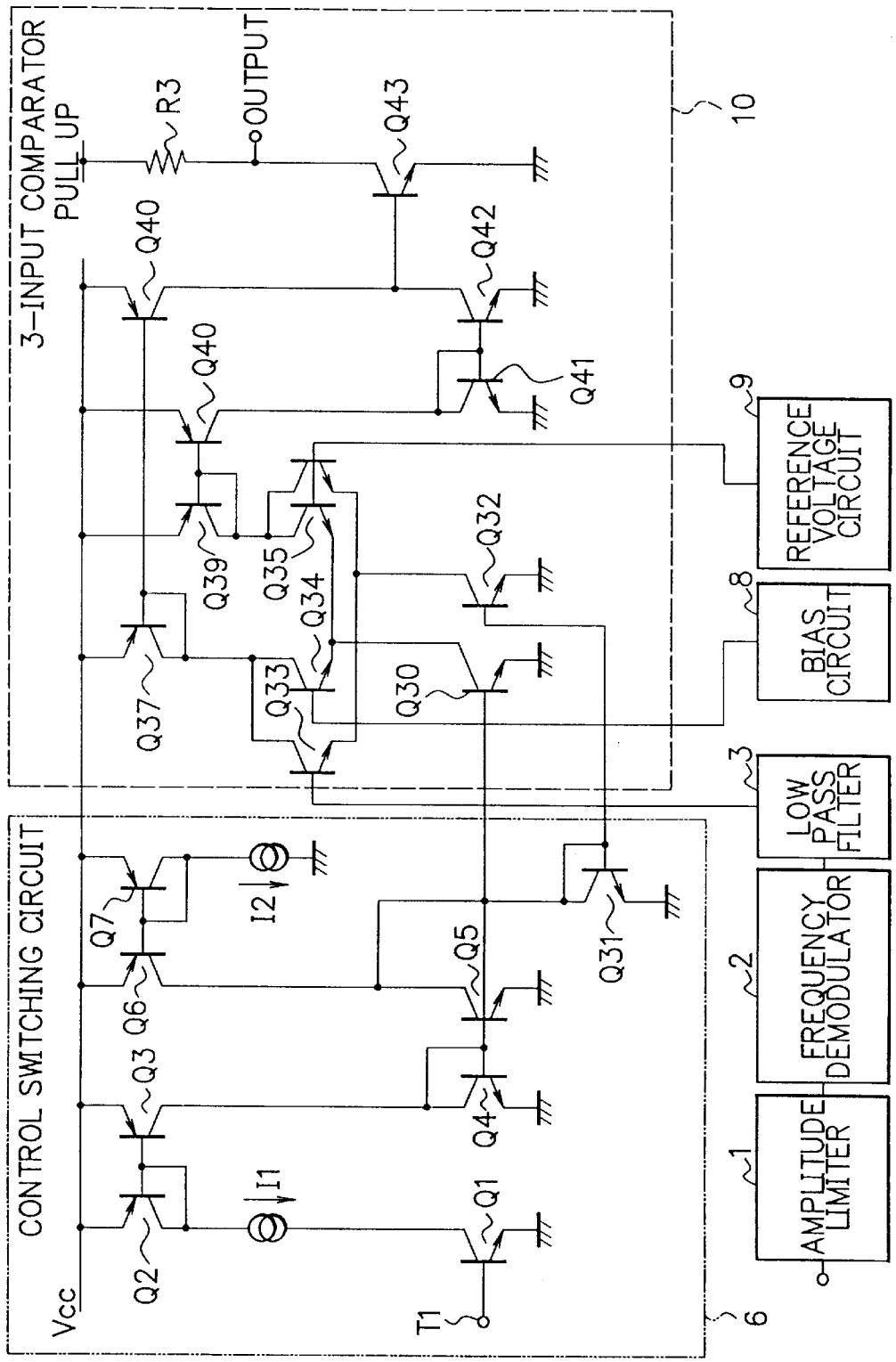
FIG. 10 is a circuit view showing a concrete example of the second embodiment of the present invention.

FIG. 10 is a circuit view showing a concrete example of the circuit according to the second embodiment. In FIG. 10, the control switching circuit 6 is within the two-dot chain line, and the 3-input comparator 10 is within the dotted line. Marks Q1 to Q43 denote transistors, R3 denotes resistor, I1, and I2 denote load current source. Further, in the present circuit, I1, and I2 are set to I1>I2 in the same way as the case of the first embodiment. Furthermore, with respect to the control logic of the control switching circuit 6, in the same way as described-above, the low voltage detector operates at the Hi-state, and the data output circuit operates at the Low-state.

In the circuit of the second embodiment, when the Hi-logic is inputted to the control terminal T1 of the control switching circuit 6, namely, the Hi-logic is inputted to the base of Q1, the current flows into Q30, and no current flows into Q32. Further, the description of the control switching circuit 6 will be omitted because the operation of the control switching circuit 6 is the same as that of the first embodiment. Here, a first differential circuit consisting of Q34, and Q35 operates because Q30 is taken as the load current source, however, a second differential circuit consisting of Q33, and Q36 does not operate because Q32 is taken as the load current source. Consequently, the output of this state has no connection with input waveform of the second differential circuit Q33, and Q36 completely, thus only depending on the first differential circuit Q34, and Q35. With respect to the input of the first differential circuit, the side of Q34 is the bias circuit depending on the battery voltage regulation, and the side of Q35 is the reference voltage independent from the battery voltage regulation.

Now, if the state both of the bias circuit voltage and the reference voltage is set to the bias circuit voltage>the reference voltage, namely, the remaining amount of the battery is of sufficient much, under the state, it is capable of regarding as Q34 being ON, and Q35 being OFF. Thus the current flows into Q37, and Q38, and no current flows Q39, Q40, Q41, and Q42. Accordingly, the current flows into Q43, thus the output becomes Low-state. The control circuit 7 judges that the remaining amount of the battery is of sufficient much while receiving instruction of the output logic Low. While, the bias circuit voltage and the reference voltage are set to the bias circuit voltage<the reference voltage, namely, in the state where the battery diminishes in the remaining amount, it is capable of regarding as Q34 being OFF, and Q35 being ON, since the current flows into Q39, Q40, Q41, and Q42, and no current flows into Q37, and Q38, no current flows into Q43, thus output becomes Hi-state. The control circuit 7 judges the state that the battery diminishes in the remaining amount while receiving instruction of the output logic Hi, thus informing it by alarm and so forth.

Figure 11A:
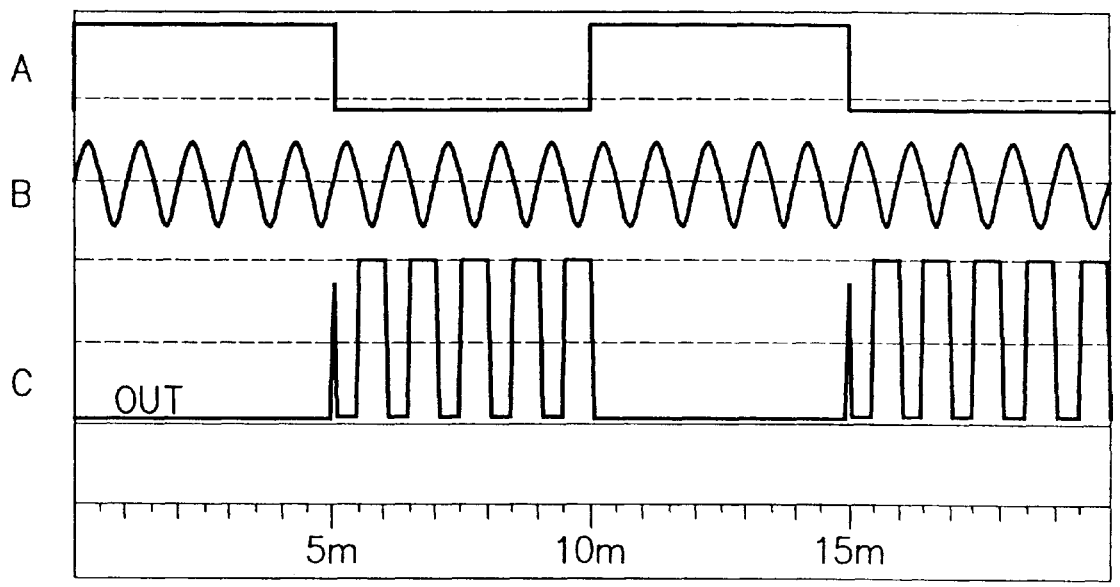
FIG. 11A is a simulation view showing a state that battery capacity is sufficient in the second embodiment.
Figure 11B:
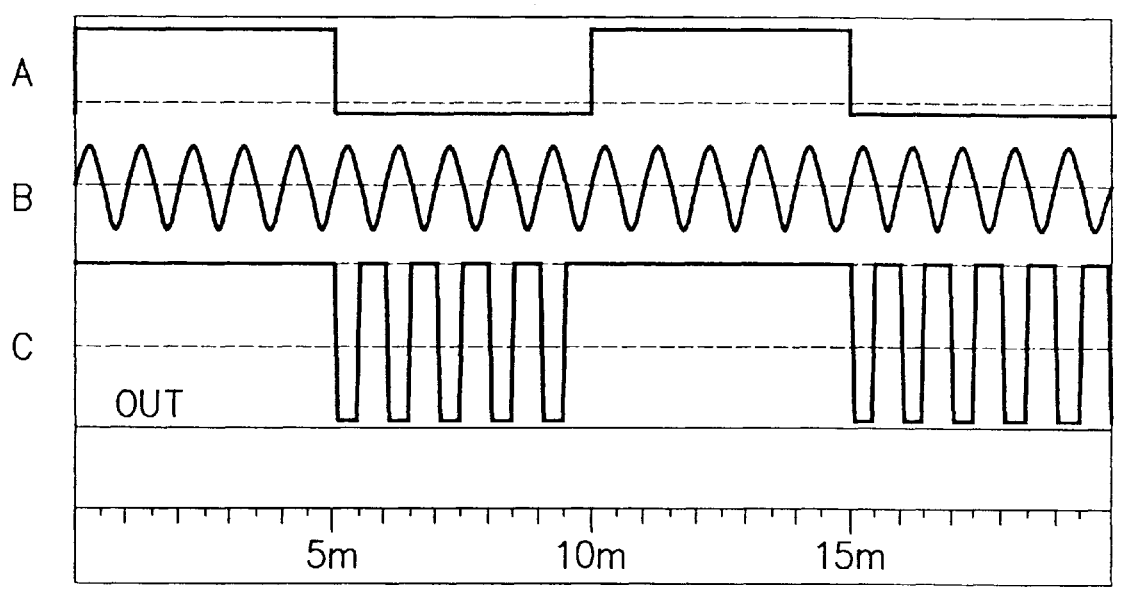
FIG. 11B is a simulation view showing a state that battery capacity is insufficient in the second embodiment.

FIGS. 11A, and 11B show result of simulation in terms of the above described circuit of the second embodiment, executed by circuit simulator such as Spice and so forth. FIG. 11A shows that the remaining amount of the battery is of sufficient much, and FIG. 11B shows the state that the battery diminishes in remaining amount. Waveform A is control logic inputted to Q1 of the control switching circuit, as stated above, the low voltage detector 5 operates under Hi-state, and the data output circuit 4 operates under Low-state. Waveform B is the waveform of data output passed through the low pass filter after frequency demodulation, in the present simulation, f is set to f=1 KHz. Waveform C denotes the output of the low voltage detector and the data output circuit, when the waveform A is Hi-logic, the control circuit 7 recognizes it as output of the low voltage detector, while when the waveform A is of Low-logic, the control circuit recognizes it as data output. As understood from these matters, when the waveform A is of the Hi-logic, FIG. 11A denotes that the remaining amount of the battery is of sufficient much because of the Low-logic, on the other hand, FIG. 11B denotes that since the battery diminishes in remaining amount, and the battery is to be changed because of the Hi-logic.

As described above, in the circuit of the second embodiment, the circuit enables these data output circuit and the low voltage detector to operate equivalently to the alternate intermittent control operation of the first embodiment. On account of this matter, the circuit of the embodiment enables low consumptive current of the reception circuit to be materialized, and enables the number of element corresponding to one block of the comparator to be reduced, therefore it becomes possible to be easy to materialize integration for the circuit configuration.

Moreover, in the above described respective embodiments, there is explained that when the control circuit logic is of the Hi-state, the low voltage detector operates, while when the control circuit logic is of the Low-state, the data output circuit operates, however, it is capable of being supposed the state that both logic are inverted.

As described-above according to the present invention, the intermittent control reception circuit causes the data output circuit and the low voltage detector to be operated selectively in compliance with logic level of signal inputted to the control terminal provided for the control switching circuit. Subsequently, the control circuit to which output of the data output circuit and output of the low voltage detector are inputted, comes to be possible to recognize which output is inputted by the control switching circuit. For this reason, the intermittent control reception circuit enables intermittent operation of the data output circuit and the low voltage detector to be implemented to materialize low consumptive current with the exception of increasing outer output terminal in cases where materialization of LSI of the reception circuit is performed. Furthermore, there is provided a common comparator both to the low voltage detector and the data output circuit causing it to be operated alternately depending on the current control, thereby it is capable of obtaining not only materialization of low consumptive current but also circuit configuration to be easy to perform high integration for the circuit.

While preferred embodiments of the invention have been described using specific terms, such description is for illustrative purpose only, and it is to be understood that changes and variations may be made without departing from the spirit or scope of the following claims.

What is claimed is:

1. An intermittent control reception circuit comprising:
    a data output circuit for outputting a received and demodulated signal as a digital signal;
    a low voltage detector for detecting a drop of a power source voltage and outputting a signal based on the power source voltage;
    a control switching circuit having a control terminal to which a timing signal is inputted; and
    a control circuit to which output signals of said data output circuit and said low voltage detector are inputs,
    wherein said control switching circuit causes said data output circuit and said low voltage detector to be operated selectively in compliance with logical state of the timing signal inputted to said control terminal, and said control circuit recognizes and correctly distinguishes both outputs of said data output circuit and said low voltage detector in compliance with logical state of said timing signal.

2. An intermittent control reception circuit comprising:
    a data output circuit for outputting a received and demodulated signal as a digital signal;
    a low voltage detector for detecting drop of a power source voltage and outputting a signal based on the power source voltage;
    a control switching circuit having a control terminal to which a timing signal is inputted; and
    a control circuit to which output signals of said data output circuit and said low voltage detector are inputs,
    wherein said low voltage detector and said data output circuit are inputs to a comparator which uses at least two load current sources outputted from said control switching circuit to selectively output signals from said low voltage detector and said data output circuit, and said control circuit recognizes and correctly distinguishes both outputs of said data output circuit and said low voltage detector in compliance with state of said comparator.

3. An intermittent control reception circuit as claimed in claim 1; wherein input-output ends of said data output circuit and said low voltage detector are connected to said control switching circuit and said control circuit respectively by way of internal circuit of a semiconductor integrated circuit device, and the control terminal of said control switching circuit is constituted by way of an outer terminal of said semiconductor integrated circuit device.

4. An intermittent control reception circuit as claimed in claim 1, wherein the timing signal whose Hi-level and Low-level are controlled alternately in prescribed cycle is inputted to said control terminal.

5. An intermittent control reception circuit as claimed in claim 4, wherein the intermittent control reception circuit is subjected to timing control in such a way that said low voltage detector starts ON-operation before prescribed time from time point when receiver operation is turned ON, while said data output circuit starts ON-operation after elapsing said prescribed time from time point when receiver operation is turned ON.

6. An intermittent control reception circuit as claimed in claim 5, wherein, at least, an amplitude limiter for limiting amplitude level of input signals being subjected to frequency demodulation to a prescribed level, a frequency demodulator for demodulating output signal of said amplitude limiter, and a low pass filter having at least one cut-off frequency are connected to said data output circuit, thus outputting said demodulated signal by way of a signal.

* * * * *